United States Patent [19]

Riegler et al.

[11] 3,901,566

[45] Aug. 26, 1975

[54] TILTABLE CONVERTER SELF-ALIGNING BEARING

[75] Inventors: Ernst Riegler, Enns; Manfred Schmidt, Linz, both of Austria

[73] Assignee: Vereinigte Osterreichische Eisen-und Stahlwerke - Alpine Montan Aktiengesellschaft, Linz, Austria

[22] Filed: Oct. 31, 1973

[21] Appl. No.: 411,442

[30] Foreign Application Priority Data
Jan. 30, 1973  Austria ................................ 774/73

[52] U.S. Cl. .................. 308/36.1; 308/72; 308/78; 308/121
[51] Int. Cl. ...... F16c 1/24; F16c 23/04; F16c 33/72
[58] Field of Search ............... 105/9, 15, 36.1, 36.3, 105/72, 73, 77, 78; 308/36.1, 72, 78, 121

[56] References Cited
UNITED STATES PATENTS

| | | | |
|---|---|---|---|
| 2,932,542 | 4/1960 | Smith | 308/9 |
| 3,113,810 | 12/1963 | Brusca | 308/36.1 |
| 3,427,081 | 2/1969 | Dellinger | 308/15 |
| 3,523,714 | 8/1970 | Puhringer | 308/5 R |

FOREIGN PATENTS OR APPLICATIONS

| | | | |
|---|---|---|---|
| 274,870 | 10/1969 | Austria | 308/36.1 |
| 293,808 | 10/1971 | Austria | 308/36.1 |
| 1,250,399 | 10/1971 | United Kingdom | 308/36.1 |

*Primary Examiner*—M. Henson Wood, Jr.
*Assistant Examiner*—Howard Beltran
*Attorney, Agent, or Firm*—Brumbaugh, Graves, Donohue & Raymond

[57] ABSTRACT

A movable bearing for a carrying trunnion of a converter, e.g. slide-articulation bearing or roller bearing, capable of taking up axial, angular (sagging) or drunken (wobbling) movements, and comprising an outer ring connected with a slide bushing and displaceable within the bearing housing in axial direction, and an inner ring which is fixed in its position by means of two spacer rings secured to the carrying trunnion, annular plastic material or rubber sealings being provided between the bearing housing and the spacer rings or the trunnion, respectively. In recesses provided in the spacer rings, sleeves are arranged with radial and axial plays to be displaceable in axial direction of the carrying trunnion. They are guided by lateral, annular bearing covers and cooperate with the annular sealings arranged in the stationary bearing housing. The spaces between the sleeves and the spacer rings are filled with a pasty sealing agent.

10 Claims, 7 Drawing Figures

PATENTED AUG 26 1975

TILTABLE CONVERTER SELF-ALIGNING BEARING

The invention relates to a movable bearing for a carrying trunnion of a converter. The bearing is capable of taking up axial, angular (sagging) and drunken (wobbling) movements, and comprises, in a bearing housing, an outer ring which is connected with a slide bushing and displaceable within said bearing housing in an axial direction, an inner ring which is fixed in position by means of two spacer rings secured to said carrying trunnion, and rubber or plastic material annular sealings which are provided between the bearing housing and the spacer rings or the trunnion, respectively. It should be noted that in the specification and in the appended claims the term bearing is meant to refer to slide-articulation bearings or to roller bearings.

Converter bearings, which accommodate carrying loads of more than 1000 mt, (metric tons) are exposed to the influences of heat and dust and must absorb drunken movements when the carrying trunnions are in oblique positions, must be constructed with great care, in particular with regard to sealing the inner space of the bearing against the intrusion of foreign bodies.

According to Austrian pat. No. 293 808, a trunnion seal has become known which is composed of a sealing line inserted into a groove surrounding the trunnion. The groove is formed of two section rings, which may be drawn towards each other in axial direction, and these section rings together with the sealing line are radially displaceable within an annular recess of the bearing housing or a bearing cover, respectively, so that even when the carrying trunnion makes a drunken (wobbling) movement, the sealing effect is maintained. Although the considerations were correct on which this construction is based, operational practice has shown that the life of the sealing is insufficient. When the trunnion is positioned obliquely, the sealing line is greatly distorted owing to the radial sliding movement in the bearing housing. The sealing material is stressed thereby to more than its elastic limit so that its elastical properties gradually are lost. In the course of time, the bearing inner space will then be "opened up" so that entering dirt, solid slag, iron or other particles will damage the bearing soon and the converter operation has to be interrupted. The exchange of a heavy converter bearing is extremely expensive.

The invention is aimed at avoiding these disadvantages and difficulties and at creating a bearing construction in which the elastic sealing is not pressed together in radial direction when the carrying trunnion makes a drunken (wobbling) movement and the forces acting upon the seal will not lead to a destruction or early wear of the sealing. The bearing construction according to the invention makes it possible to take up angular and drunken (wobbling) movements, as well as axial movements, of the carrying trunnion, while maintaining the sealing effect at any period.

In a bearing construction of the kind defined in the introduction, these aims of the invention are achieved in that the annular sealings arranged in the fixed bearing housing cooperate with sleeves which are displaceable in an axial direction of the carrying trunnion. The sleeves are inserted into recesses of the spacer rings with radial and axial play and are guided by lateral, annular housing covers, the spaces between the sleeves and the spacer rings being filled with a pasty sealing agent, e.g. bearing lubricating grease.

According to a further feature of the invention, on the end faces of the axially displaceable sleeves, annular sealings are arranged which preferably have a C-shaped cross section.

An embodiment of the invention is characterized in that the sealings are designed as steel rings which are displaceable in longitudinal direction in the sleeve wall. For each steel ring, at least three pressure springs are arranged in a circumferential direction and abut against the sleeve.

A further embodiment of the invention resides in the creation of a labyrinth gland. This labyrinth gland is created in that the axially displaceable sleeves are provided with at least one flange-like stud which projects into the interior and engages a corresponding recess of the spacer rings with play, the lateral faces of this flange-shaped stud and of the corresponding recess being designed as spherical faces with a common central point arranged in the middle of the bearing.

In all embodiments according to the invention, it is suitable that a conduit for the supply of the pasty sealing agent ends into the space between the axially displaceable sleeves.

In order that the invention may be more fully understood, details thereof shall now be explained with reference to the accompanying drawings.

Figure 1:
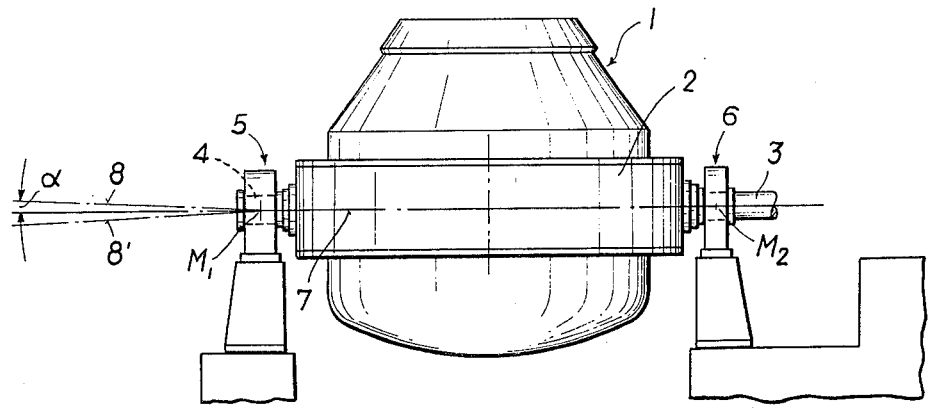
FIG. 1 is a total lateral view of a converter with its carrying bearings.

In FIG. 1, numeral 1 denotes a converter which is surrounded by a carrying ring 2 and tiltably supported by means of the carrying trunnions 3,4 in a movable bearing 5 and a fixed bearing 6. $M_1$ and $M_2$ denote the central points of the movable bearing 5 and of the fixed bearing 6, through which also the carrying trunnion axis 7 is laid. Owing to thermal influences, the carrying trunnions 3,4 may be obliquely positioned. Such oblique axes are denoted with 8 and 8', the deviation $\alpha$ from the axis 7 amounting to about ± 1°.

Figure 2:
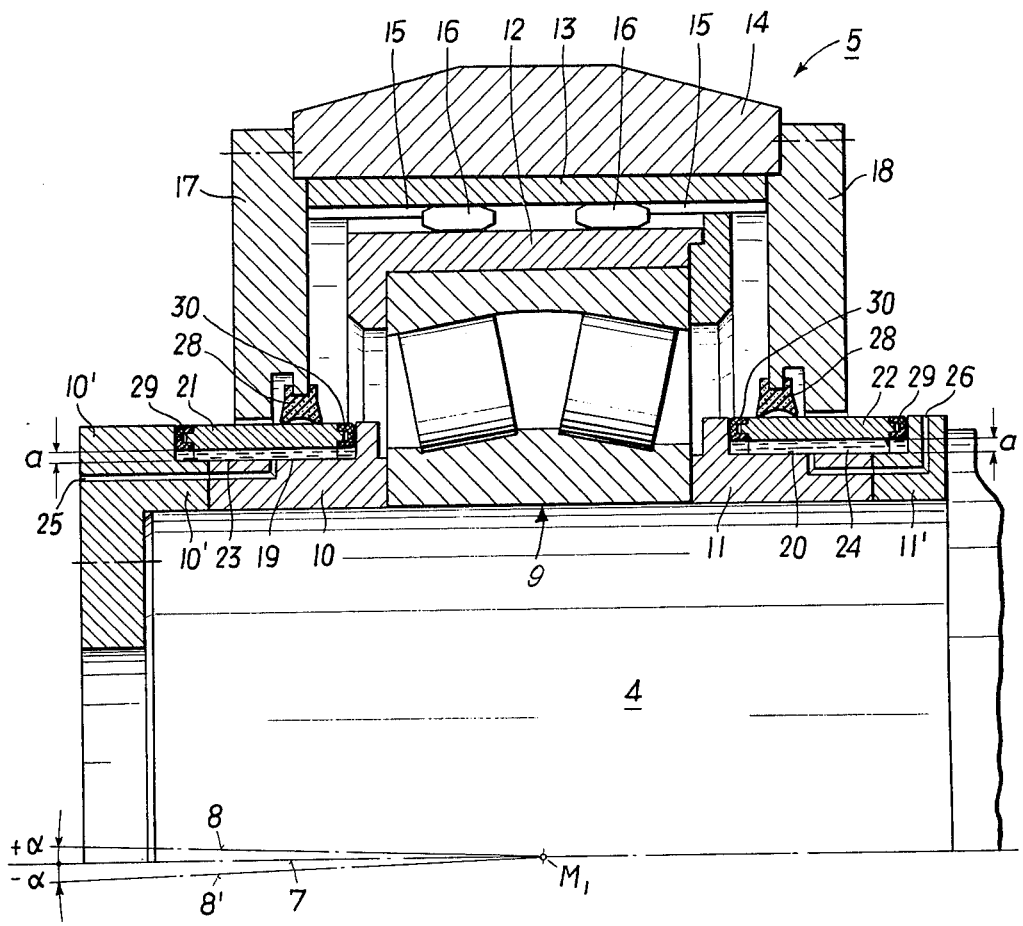
FIG. 2 is a sectional view of the upper part of a movable bearing.

In FIG. 2, numeral 9 denotes a roller bearing which is secured to the carrying trunnion 4. It should be noted that the term roller bearing is meant to include pendulum roller bearings, barrel bearings, Such a pendulum roller bearing is described, for example, in Austrian pat. No. 274,870. The bearing 9 may also be a slide-articulation bearing, such as is described, for example, in German Utility Model No. 71 39 476.

The roller bearing 9 is fixed in position by spacer rings 10,10',11,11' which are secured on both sides of the carrying trunnion 4. As viewed in axial direction, the spacer rings are made of two parts so that they may be more easily produced and mounted. The spacer rings 10,10' and 11,11' hold the inner ring of the bearing. The bearing outer ring is surrounded by a slide bushing 12, which is axially displaceable relative to a protective bushing 13 which is secured in the housing 14. In the protective bushing 13, axially arranged grooves 15 with fitting keys 16 are provided so that the slide bushing 12 cannot be twisted in circumferential direction. Numerals 17 and 18 denote lateral housing covers. In the spacer rings 10,10' and 11,11', recesses 19,20 are arranged to run around their circumference. Sleeves 21,22 are inserted in recesses 19,20 with a radial play $a$ so that annular hollow spaces 23,24 are formed which are filled with a pasty sealing agent, preferably bearing lubricating grease. Numerals 25,26 are channels through which the pasty sealing agent is supplied or refilled into the spaces 23,24.

Figure 3:
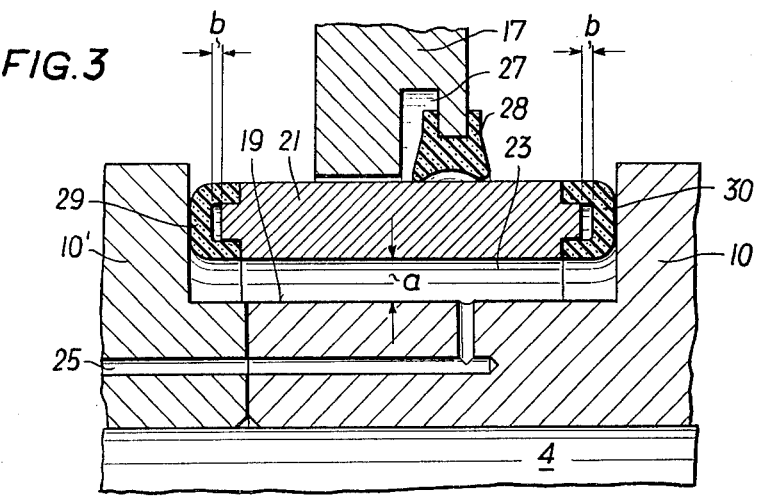
FIG. 3 shows part of FIG. 2 at enlarged scale and illustrates the sealing between the bearing housing and a spacer ring.
Figure 4:
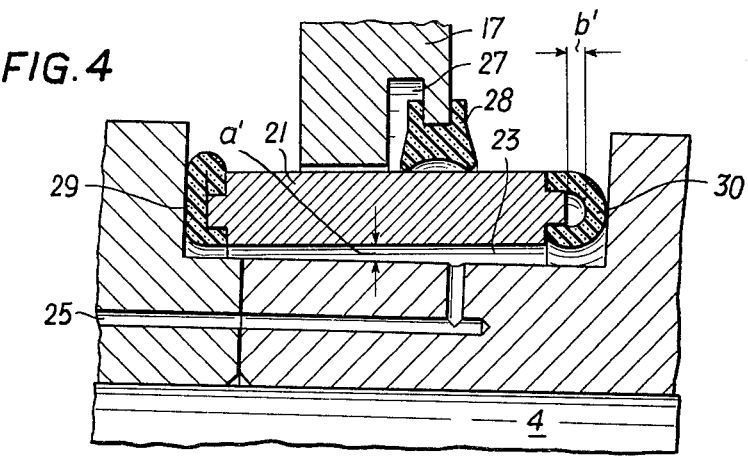
FIG. 4 is a similar representation as FIG. 3, wherein in the carrying trunnion has carried out an axial movement and an angular displacement.

As may be derived in detail from FIGS. 3 and 4, the sleeve 21 is guided by the annular housing cover 17 so that it is displaced in axial direction and may follow the heat expansion of the carrying trunnion 4. In the housing cover 17, in the recess 27, a labial sealing 28 of rubber or plastic material is arranged. When the sleeve 21 is radially displaced, it is not subjected to any radial stress so that its capacity to function is practically not changed during operation time. The sleeve 22 (FIG. 2) is designed in the same manner as the sleeve 21, being guided by the housing cover 18 and provided with a labial sealing 28.

At the two end faces of the sleeve 21 (and in analogous manner the sleeve 22), which is axially displaceable within the housing cover 17, annular sealings 29,30 of rubber or plastic material with a C-shaped cross section are arranged in a manner that their inner sides are at the distance $b$ from the end faces. Under consideration of the geometrical conditions and the possible displacement of the carrying trunnion 4, the play $b$ has such dimensions that no excessive stress will occur. As may be derived from a comparison of FIGS. 3 and 4, the play $b$ of the sealing 29 may, for example, be reduced to zero and the play $b$ of the sealing 30 may be enlarged to $b'$, while the radial distance $a$ is reduced to $a'$ so that a displacement of the bearing grease cushion which fills out the space 23 (24) takes place in axial and circumferential directions. When the carrying trunnion 4 makes an axial and/or drunken (wobbling) or angular (sagging) movement, only a displacement of the bearing grease and an axial displacement of the sleeves 21 or 22, respectively, relative to the fixed housing covers 17 or 18, respectively, will take place. In such a displacement, the bearing grease may escape upwardly in both sealings 29,30 whereby on the one hand, dust and solid particles which have accumulated in the area of the sealing 29 may be removed and, on the other hand, fresh bearing grease may be supplied through the sealing 30 into the inner space of the bearing. It is therefore suitable to refill, at intervals, bearing grease through the channels 25.

Figure 5:
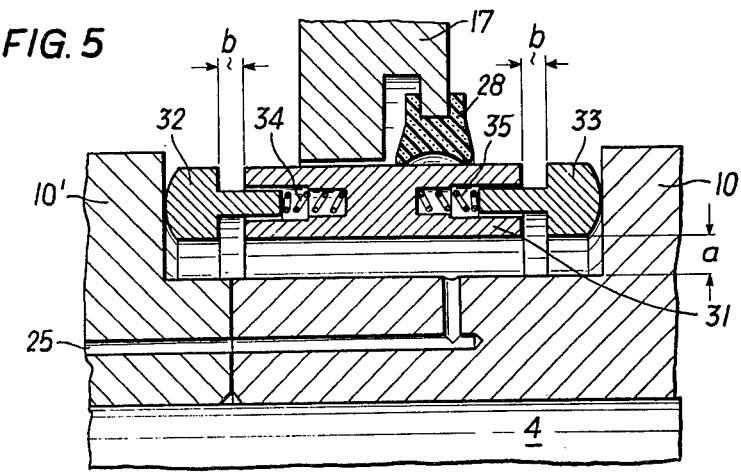
FIG. 5 is a similar representation as FIG. 3 with different sealing elements.

In the embodiment according to FIG. 5, in which the axially displaceable sleeve is denoted with numeral 31, annular seals 32,33 of steel are provided which are guided at the end faces in the sleeve wall to be displaceable and are maintained in their position by means of pressure springs 34,35. Each steel sealing ring 32,33 is axially movable by the measure $b$ when the carrying trunnion 4 is displaced together with the spacer ring 10,10'. In circumferential direction, at least three springs 34,35 are provided for each steel ring 32,33.

Figure 6:
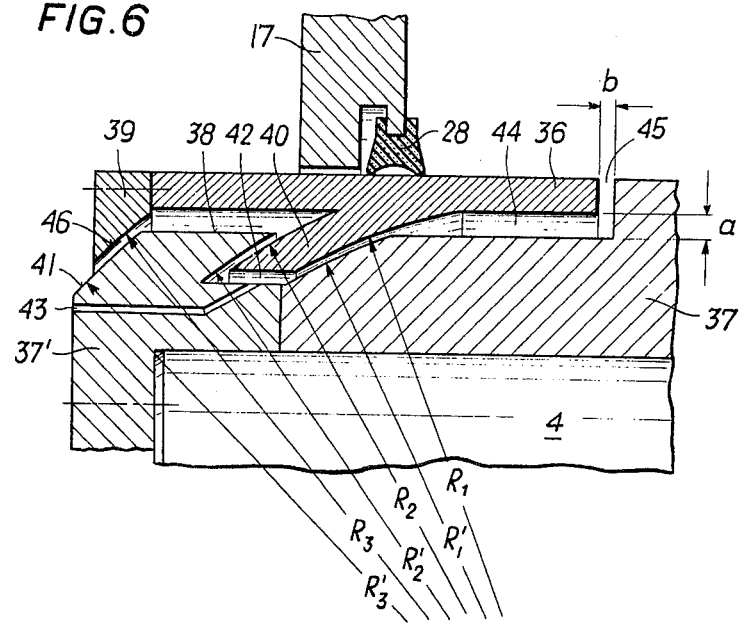
FIG. 6 is a similar representation as FIG. 3 with labyrinth gland elements.

In the embodiment according to FIG. 6 again, there is provided a sleeve 36 which is axially movable and displaceable relative to the housing cover 17 with its labial sealing 28. The sleeve 36 surrounds spacer ring 37,37', which is made of two parts, seen in axial direction, and which has a recess 38. The space between sleeve and spacer ring in the radial direction is again denoted with $a$ and the space in the axial direction with $b$. For the formation of a labyrinth gland in the sleeve 36, studs 39,40 are provided which are designed like flanges and engage into corresponding recesses 41,42 of the spacer rings 37,37'. The side faces of the studs 39, 40 and the corresponding side faces of the recesses 41,42 are designed as spherical faces having the radii $R_1$, $R_2$, $R_3$ or $R_1'$, $R_2'$, $R_3'$ respectively. Their common central point lies in the central point M of the bearing 5 or 9, respectively, so that the carrying trunnion 4 together with its spacer ring 37,37' may follow an angular displacement $\pm\alpha$. At the same time, an axial displacement of the sleeve 36 relative to the housing cover 17 is also possible, as has already been stated. As the space 44 is filled with grease, a safe sealing in any position of the carrying trunnion 4 is achieved. When the bearing lubricating grease cushion is displaced, the grease escapes through the annular channel 45 into the bearing interior and through the annular channel 46 into the open against any intrusion of dirt and solid particles. The lubrication grease store is filled up through the channel 43 which ends in the bottom of the recess 42. If desired, in the labyrinth gland, further annular sealings of rubber or plastic material may be provided, e.g. for closing the channels 45,46.

Figure 7:
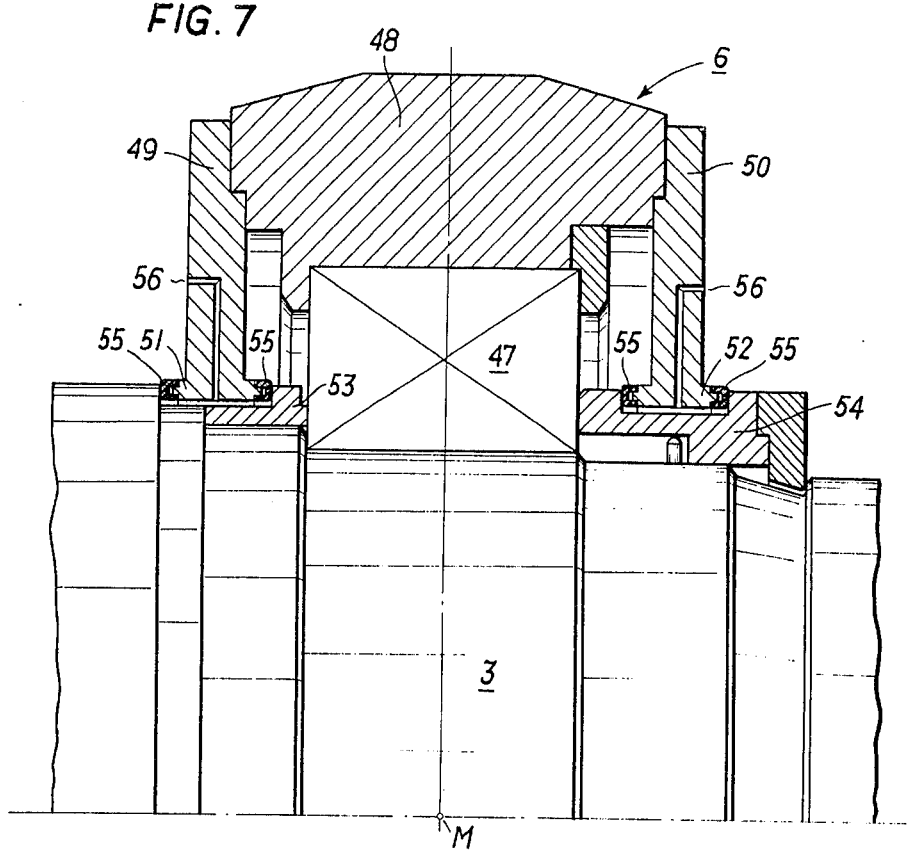
FIG. 7 is a similar representation as FIG. 2 and shows a fixed bearing for a converter arranged opposite the movable bearing.

In FIG. 7, the fixed bearing 6 is shown, in which the slide-articulation bearing or roller bearing 47 is fixed so that it is not axially displaceable relative to the housing 48. The lateral housing covers 49,50 are integrally connected with bushings 51,52 which are provided at both end faces with resilient sealings 55. The spacer rings are denoted with numerals 53,54 and the channels for the bearing lubricating grease which end in the inner wall of the bushings 51,52 with numeral 56. When the carrying trunnion 3 makes an angular movement around the bearing central point M, the spacer rings 53,54 are moved together with the trunnion, while the bushings 51,52 remain fixed in their position.

What we claim is:

1. A movable bearing for a carrying trunnion of a converter, the bearing being adapted to accommodate axial, angular and wobbling movements of the trunnion, comprising:
    a. a bearing housing including annular, radially inwardly depending portions at different ends of the housing;
    b. a slide bushing secured to and within the bearing housing;
    c. an outer ring coupled to the slide bushing so as to be displaceable within the bearing housing in an axial direction;
    d. an inner ring within the outer ring and adapted for rotational movement relative to the outer ring;
    e. at least one spacer ring located adjacent each end of the inner ring and adapted to be secured on a carrying trunnion so as to fix the inner ring in position axially of the trunnion, a recess being formed in said at least one spacer ring at each end of the inner ring;

f. a sleeve disposed in each of the recesses of the spacer rings and encircling a respective spacer ring, the sleeves and the recesses being dimensioned to provide both axial and radial spaces between the sleeves and the spacer rings, the sleeves also being located relative to the depending portions of the bearing housing such that the sleeves are guided by the depending portions of the bearing housing so as to move relative to the spacer rings upon movement of a trunnion journaled in the bearing;

g. at least one annular housing sealing member, disposed at each end of the bearing housing between at least a part of a depending portion of the bearing housing and a sleeve; and h. a pasty sealing agent filling spaces between the sleeves and the spacer rings.

2. A movable bearing according to claim 1, wherein the housing sealing members are resilient and are fabricated of rubber.

3. A movable bearing according to claim 1, wherein the housing sealing members are resilient and are fabricated of a plastic material.

4. A movable bearing according to claim 1, wherein the pasty sealing agent is bearing lubricating grease.

5. A movable bearing accarding to claim 1, also comprising annular sleeve sealing members disposed at end faces of the sleeves.

6. A movable bearing according to claim 5, wherein the sleeve sealing members are C-shaped in transverse action.

7. A movable bearing according to claim 5, wherein the sleeve sealing members are steel rings, and wherein the bearing also comprises at least three springs spaced apart about the circumference of each steel ring and extending between the steel ring and a portion of a sleeve, the steel rings being adapted for axial movement relative to the sleeves.

8. A movable bearing according to claim 1, wherein the sleeves each have at least one flange projecting radially inwardly of the sleeve and wherein the recesses of the spacer rings are correspondingly configured to receive the flanges of the sleeves so that said flanges are spaced from adjacent surfaces of the spacer rings, radially extending surfaces of the flanges and adjacent radially extending surfaces of the spacer rings having spherical configurations all generated from a common center point located at the center of the bearing.

9. A movable bearing according to claim 1, wherein conduits are formed in the spacer rings for supplying pasty sealing agent to spaces between the sleeves and the spacer rings.

10. A movable bearing for journaling a carrying trunnion of a converter, the bearing being adapted to accommodate axial, angular and wobbling movements of the trunnion, comprising:

a. a bearing housing including annular, radially inwardly depending portions at different ends of the housing;

b. an outer ring mounted in the housing so as to be displaceable within the housing in an axial direction;

c. an inner ring within the outer ring and adapted for rotational movement relative to the outer ring;

d. at least one spacer ring located adjacent each end of the inner ring and adapted to be secured on a carrying trunnion so as to fix the inner ring in position axially of the trunnion, a recess being formed in said at least one spacer ring at each end of the inner ring; and e. a sleeve disposed in each of the recesses in said spacer rings and encircling a respective spacer ring, the sleeves and the recesses being dimensioned to provide both axial and radial spaces between adjacent surfaces of the sleeves and the spacer rings, the spaces being adapted to receive a supporting and lubricating medium, the sleeves being disposed relative to the depending portions of the housing so as to limit relative movement therebetween and so that the sleeves tend to move relative to the spacer rings upon movement of a trunnion journaled in the bearing.

* * * * *